United States Patent [19]

Brichta et al.

[11] Patent Number: 4,959,397
[45] Date of Patent: Sep. 25, 1990

[54] SOFT AND LOW-DENSITY FOAM MATERIALS FROM MODIFIED COPOLYMERS OF ETHYLENE WITH VINYL ACETATE AND/OR ALKYL ESTERS OF ACRYLIC OR METHACRYLIC ACID

[75] Inventors: Corrado Brichta, Milan; Annibale Vezzoli, Carugo; Angelo Borghi, Gerenzano, all of Italy

[73] Assignee: Montedipe S.p.A., Milan, Italy

[21] Appl. No.: 338,369

[22] Filed: Apr. 13, 1989

Related U.S. Application Data

[63] Continuation of Ser. No. 208,861, Jun. 14, 1988, abandoned, which is a continuation of Ser. No. 863,044, May 14, 1986, abandoned.

[30] Foreign Application Priority Data

May 15, 1985 [IT] Italy ................................ 20729 A85

[51] Int. Cl.$^5$ ................................................ C08J 9/14
[52] U.S. Cl. ........................................ 521/96; 521/98; 521/149
[58] Field of Search ............................ 521/149, 96, 98

[56] References Cited

U.S. PATENT DOCUMENTS

| 3,965,054 | 6/1976 | Nojiri et al. ................ 521/143 |
| 4,021,380 | 5/1977 | Nuttald ......................... 521/85 |
| 4,166,890 | 9/1979 | Fried et al. .................... 521/95 |
| 4,501,711 | 2/1985 | Senuma et al. ................ 521/79 |
| 4,519,963 | 5/1985 | Yoshida et al. ............... 521/96 |
| 4,607,059 | 8/1986 | Kmiec et al. .................. 521/88 |
| 4,607,060 | 8/1986 | Kmiec et al. .................. 521/89 |

FOREIGN PATENT DOCUMENTS 54271 8/1966 Luxembourg .
1059426 11/1964 United Kingdom .

OTHER PUBLICATIONS

Chemical Abstract vol. 88, 1978, p. 49, Abstr. No. 90733K (JP-A-77 12575-Sumitomo).
Acta Polymerica, vol. 31, No. 4, 1980, pp. 243-247. T. Taplick et al.

Primary Examiner—Morton Foelak
Attorney, Agent, or Firm—Stevens, Davis, Miller & Mosher

[57] ABSTRACT

Soft and low-density foam materials, obtained by means of an extrusion expansion (with physical blowing agents) of particular copolymers of ethylene with vinylacetate (and/or with alkyl esters of acrylic or methacrylic acid), are found to be very suitable for the manufacture of expanded articles with little shrinkage after expansion, free from creases on the surface or cracks on the cell walls, and having excellent characteristics, higher compressive strength and so on.

6 Claims, 2 Drawing Sheets (*) $[\eta]$ = cm$^3$/g (at 80°C in stabilized tetrahydronaphthalene)

(*) $[\eta]$ = cm$^3$/g (at 80°C in stabilized tetrahydronaphthalene)

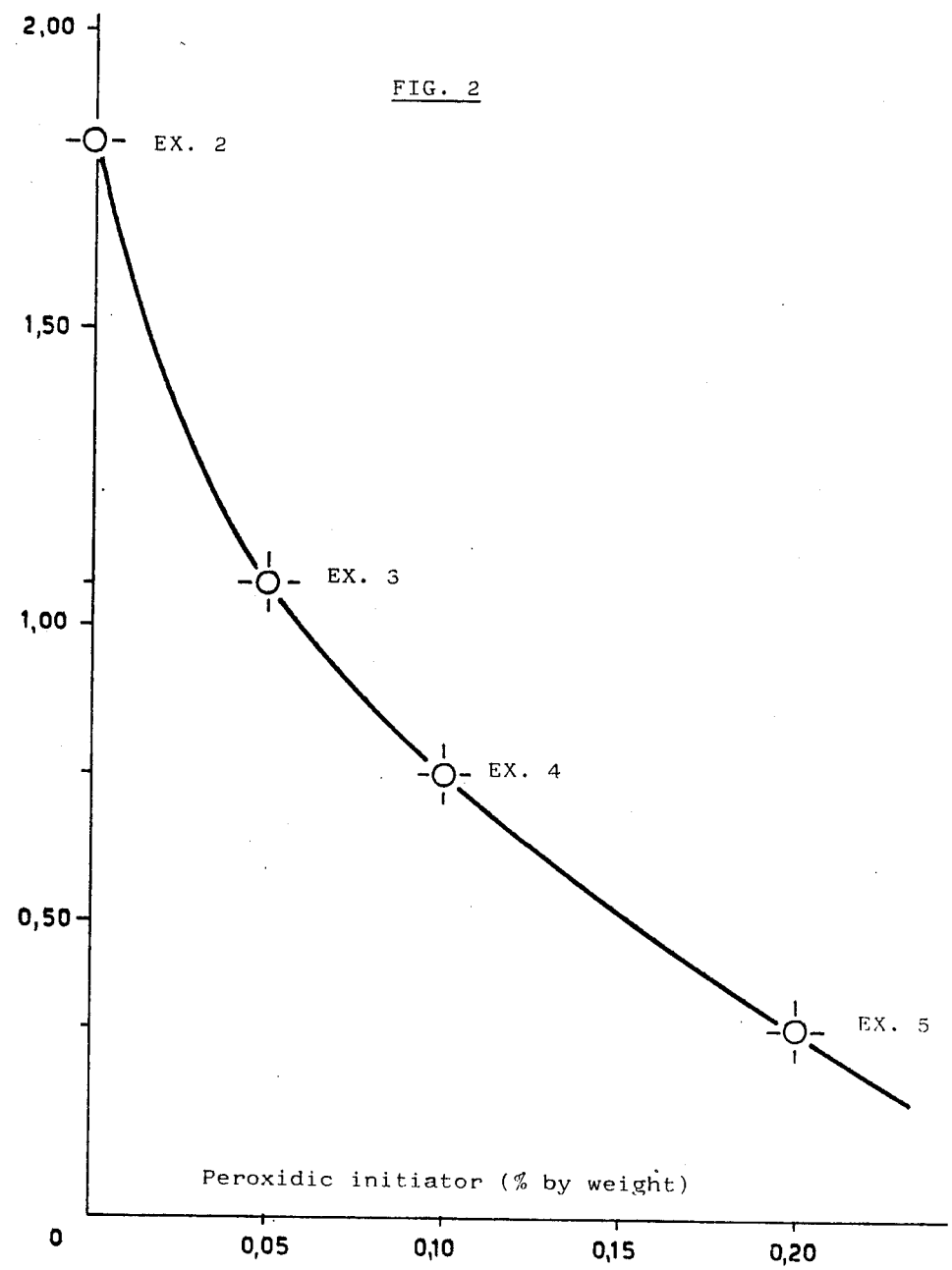

SOFT AND LOW-DENSITY FOAM MATERIALS FROM MODIFIED COPOLYMERS OF ETHYLENE WITH VINYL ACETATE AND/OR ALKYL ESTERS OF ACRYLIC OR METHACRYLIC ACID

This application is a continuation of application Ser. No. 208,861, filed June 14, 1988, which in turn is a continuation of application Ser. No. 863,044, filed May 14, 1986, now both abandoned.

BACKGROUND OF THE INVENTION

It is known to expand polymers, following a physical method; a liquefied gas is added to the molten resin and the evaporation of said liquified gas (at the outlet of an extruder's orifice) gives rise to a cellular structure. The foam materials obtained until now are not free from shortcomings, like for instance an unacceptable shrinkage and a change of density with time, namely a poor dimensional stability. To suppress such drawbacks, a particular blowing agent was proposed, the 1-2-dichloro-tetrafluoro-ethane (known also as ALGOFRENE 114) suggested for instance by Japanese Patent Publication 60/4341. Also by this way, however, it isn't possible to eliminate completely such drawbacks and to obtain high quality foam materials. That is true especially for the surface smoothness of low-density materials ($\rho < 100$ Kg/m$^3$).

Recent papers described the extrusion expansion of polyolefinic compositions containing special additives for the control of the dimensional stability, in particular additives comprising fatty acid amides, the corresponding amines and the esters of the same acids (U.S. Pat. No. 4,214,054), as well as the semiesters of said acids with polyols (U.S. Pat. Nos. 3,644,230 and 3,755,208). We remember, moreover, the aliphatic esters and semiesters of U.S. Pat. No. 4,345,041, as well as the corresponding technologies (see Japanese Patent Publications 78/102971, 79/34374 and 79/39467). Unfortunately, such additives involve some shortcomings, if flexible foam materials of very low density are required (20-40 Kg/cm$^3$). The poor compatibility with polyolefins in fact gives rise to diffusion phenomena after the expansions and the foam materials, therefore, display a poor stability when in contact with metals (in the presence of moisture), because of corrosion. This shows unsatisfactory features for the thermal and electric insulation (this is true e.g. in the case of a cable jackets and insulations). These methods, moreover, are requiring non neglectable consumption of blowing agent.

The expansion of polyolefines by chemical blowing agents, e.g. azodicarbonamide ($H_2N-OOC-N=N-COONH_2$), was also already described. In this case, a cross linking occurs, under formation of transversal —C—C— bonds between the polyolefinic chains, realized e.g. by means of peroxides. See hereinafter formula (I). Such cross-linking permits the utilization of a wider range of visco-elasticity for the polymer, during the expansion step.

The increase in viscosity of the molten polymer, however, consequent to said cross-linking, does not permit, in this case, a normal extrusion. The expansion, therefore, must occur successively or contemporaneously to the cross-linking and not before that. For the manufacture on industrial scale of high quality foam materials, until now, only chemical blowing agents were used, which permit compact (not expanded) semifinished products, which then undergo a cross-linking and a thermal expansion caused by the gases released by decomposition of the blowing agents during an expansion molding. Such methods require a heavy immobilization and don't permit low-density foam materials to be obtained (in particular when $\rho = 25$-50 Kg/m$^3$), like the materials bound to the packaging of food and to the building field, where usually are requested, in view of the thermal insulation, also suitable fire-extinguishing features (see e.g. European Patent No. 144,015, in the name of the Applicant).

The Applicant has now found an extrusion expansion process, using physical blowing agents, for compositions based on copolymers of ethylene with vinyl acetate, which permits, also in the absence of additives for the dimensional stability control, to obtain outstanding soft and low-density materials (with fair dimensional stability and fair superficial smoothness, free from creases on the surface and of cracks on the cell walls, with high compression strength) suitable for the thermal or electrical insulation as well as for the packing field. Such process permits, moreover, to lower the consumption of halogenated propellant, as well as an increase in the extruder output capacity.

BRIEF DESCRIPTION OF THE DRAWINGS

FIG. 2 also shows values of intrinsic viscosity and MFI.

DISCLOSURE OF THE INVENTION

Figure 1:
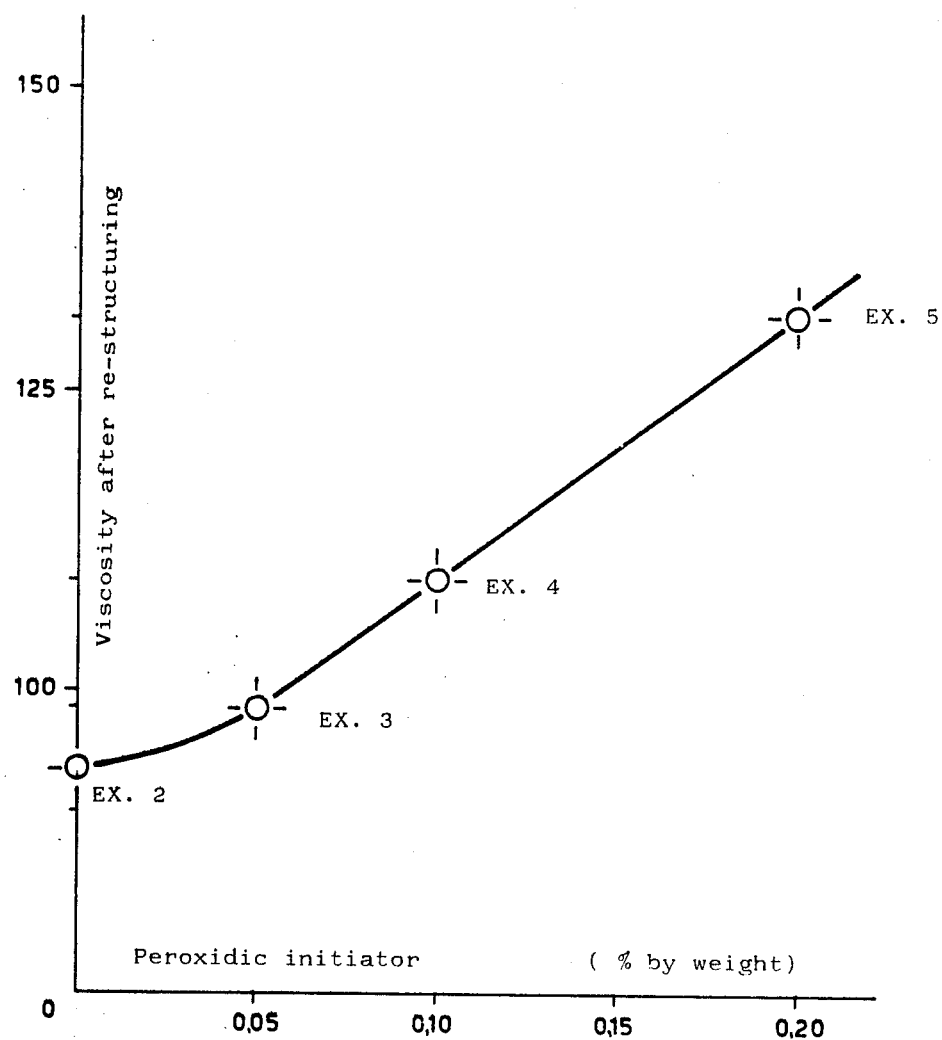
FIG. 1 shows values of intrinsic viscosity and MFI.

In its widest form, the invention concerns soft and low-density foam materials comprising copolymers of ethylene with vinyl acetate and/or alkyl esters of acrylic or methacrylic acid, characterized in that:

the copolymers are at least partially re-structured, in a selective way, showing the particular fused structures hereinafter described;

the amount of co-monomer, within the copolymers, ranges from 5 to 30%, preferably from 5 to 15% and even better from 7.5 to 10% by weight;

the copolymers contain an amount of non-hydrolyzable gel (insoluble, at 80° C. in tetraline, stabilized with Irganox 1076) substantially null and anyway lower than 5% by weight;

the MFI index of the foams isn't higher than 1.1 g/10' (at 2.16 Kg and 190° C.).

As to the behaviour of the copolymers towards hydrolysis, we make explicit reference to an article of M. Rätzsch and M. Schönfeld on "Plaste und Kautschuk" (19 Jahrgang; Heft 8; 1972; page 565).

The MFI index (Melt Flow Index) corresponds to the fluidity degree of the copolymers or of the compositions and decreases when the viscosity increases. The MFI of the original polymer (synthesis polymer, not yet restructured) should suitably be $\geq 1$, preferably from 1 to 4 and even better from 1.16 to 2 g/10 minutes.

The invention concerns in particular the foam materials obtained from EVA copolymers (ethylene/Vinyl-Acetate copolymers), in which also other comonomers, like for instance CO may be present. Preferably the original EVA polymers (not yet restructured) should have a density from 0.92 to 0.95 g/cm$^3$ (better 0.920-0.935) and can be also used within blends containing up to 20% b.w. (preferably 5-10%) of at least one second polymer, selected for instance from the group consisting of low, medium and high-density polyethylene, polypropylene and ethylene-propylene copolymers. We give now some detailed explanation concerning the used terminology; and we state first that in a copolymer "restructed in a selective way" the cross-linking due to formation of transversal —C—C— bonds between two polyethylenic chains, of the (I) type hereinafter, shall be substantially absent:

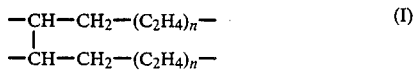

Secondly, it is necessary to have transversal bonds, of a new type and different from the above (I) bonds, between the chains of the copolymer; such new bonds (see formulas II and III hereinafter) shall be substantially all hydrolyzable, according to what is stated by the article of Rätsch and Schönfeld hereinabove and by an article of Taplick and Rätsch on "Acta Polimerica" Band 31 (1980); Heft 4; pag. 243–247; we list hereinbelow some of the bonds described by said articles:

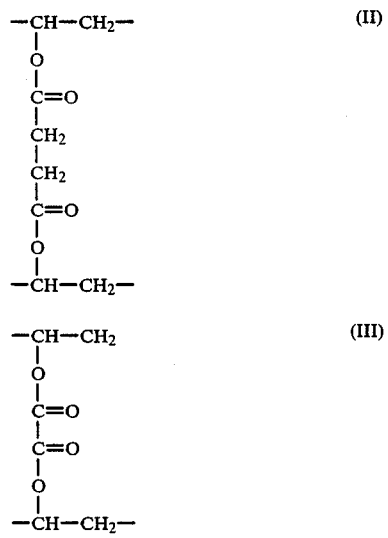

The (II) bond, firstly described by Schönfeld, may shortly be indicated as a succinic bridge and bond (III), described by Taplick and Rätsch, may be defined, in a brief form, as an oxalic bridge. Our restructed copolymers can most preferably be obtained by means of a so called "one step reactive processing" comprising radicalic reactions which give rise to best rheological properties as to the plastic flow. The features in turn permit adjustment and control very easily the temperature and the viscosity of the molten resin during the contact with the physical blowing agents (usually fluoro-chloro-hydrocarbons).

The radical initiators which can be used for restructuring the copolymers are for instance those peroxides owing a decomposition temperature of 120°–200° C. (preferably 140°–160° C.), like terbutyl-perbenzoate, ethyl-3,3-bis(terbutyl-peroxy)-butyrrate and 1,1-bis-(terbutyl-peroxy)-3,5,5-trimethyl-cyclohexane, as well as their mixtures. For this last peroxide, the amount that can be suggested, to promote the selective restructuration, should be from 0.05 to 0.50% b.w. and preferably 0.1–0.2% (for the copolymer). Should another peroxide be used, its amount shall be such as to provide an equivalent (molar) concentration of radical centers. Non-peroxidic radical initiators can be used as well, like for instance azo-compounds, sulphonic acid hydrazides, 1,2-diphenylethane derivatives, etc., provided they promote the selective restructuration and do not give rise to cross-linkings under formation of an insoluble and not hydrolyzable gel, the structure of which gel is represented by the transversal —C—C— linkages between the polyethylenic portions of the chains, as illustrated by the formula (I) hereinabove. Such undesired and non hydrolyzable linkages originate, for instance, when the amount of peroxide becomes too large.

As a physical blowing agent, a liquid or low-boiling organic fluoroderivative can be used, like for instance dichloro-tetrafluoroethane, fluorotrichloromethane and mixtures thereof, preferably 1,2-dichloro-tetrafluoro-ethane and/or its mixtures with carbon dioxide. The blowing agents are used in amounts up to 40% b.w. (preferably 15–30 p.h.r., namely parts by weight per 100 parts of copolymer). One can add, moreover, preferably in amounts not higher than 3% b.w., antioxidants, stabilizers (against the action of U.V. ray and of metals), lubricating compounds, pigments, nucleating agents (for instance various silicates like talcum), metal oxides (e.g. ZnO), metallic salts of fatty acids (e.g. zinc stearate) and others; it is yet possible to add, also in concentrations higher than 3%, some fire-estinguishing agent. All additive inhibiting in a critical way the radicalic reaction of restructuration (giving rise to the already described hydrolyzable fused structures) shall be avoided.

Different are the possible realization forms for the invention. According to a first embodiment, the polymeric compositions are homogenized and granulated, preferably within an extruder, usually within a residence time of 0.5–20 minutes, just before the true extrusion-expansion (in the presence of physical blowing agents); during the homogenization, at 120°–200° C. (better 130°–160° C.), we noted an at least partial selective restructuration of the polymer, but the same restructuration can follow and eventually come to an end also in the successive extrusion-expansion, either before or after the injection of the fluorinated propellant. Obviously, the already restructured and granulated compositions can successively be admixed with all those additives (in particular stabilizers), the use of which wasn't beforehand advisable for restructuration purposes.

According to a second, different and most preferred form of realization, the EVA copolymer can be compounded with the radical initiators and admixed with other additives at room temperature, within a usual powder mixture, having for instance sigma blades (or within a speedy mixer of the Henschel type or even within a simple tumbler) and then fed directly to the extrusion-expansion, using physical blowing agents, without any preliminary hot-granulation and according to usual techniques, by means of a mono-screw or twin-screw extrusion line. The restructuration caused by the peroxide occurs, for the most part, at 130°–160° C. and usually within 0.5–10 minutes. It is essential that the additives, in liquid or in powder form, be homogenized and spread in a uniform way onto the surface of the granules, physically adhering thereto, to avoid sedimentation during the further processings.

Such second embodiment can briefly be indicated as a "one step" process and the Applicants surprisingly noted that the swelling of the copolymer by means of the halogenated propellant, just during the "one step" operation, considerably promoted the formation of the succinic or oxalic bridges which are responsible for the outstanding features of the new foam materials. Furtherly the formation of insoluble gels can thus be practically reduced to zero.

The following examples illustrate the invention without limiting however in any way the scope thereof.

MODALITIES COMMON TO ALL EXAMPLES

To evaluate the foam materials, tubular specimens were prepared having an external diameter of 60 mm, an internal diameter of 42 mm and a length of 50 cm. The specimens were submitted to protracted shrinkage (after foaming); external smoothness and surface conditions were evaluated after dimensional stability was reached. The shrinkage was expressed as the percent variation of the volume of the specimens 7 days after foaming, according to the equation:

Shrinkage ($n$ days after foaming) =

$$\left(1 - \frac{\text{final volume after } n \text{ days}}{\text{initial volume}}\right) \cdot 100$$

Surface conditions and smoothness were evaluated on the basis of the indexes reported at the foot of Table 1; for usual applications, it is preferable that the foam materials have a shrinkage lower than 15%.

EXAMPLE 1 (COMPARATIVE)

100 parts by weight of basic resin consisting of EVA copolymer [trade name Baylon V 10H 460; produced by Bayer; vinylacetate content=8.5% by weight; effective density: 0.928 g/cm$^3$; Melt Flow Index (at 2.16 Kg and 190° C., according to DIN 53735 or according to ASTM-D-1238-82)=1.5 g/10'] were uniformly mixed at room temperature, in a suitable mixer, with 1.5 parts by weight of zinc stearate, 0.8 parts by weight of talc, 0.1 parts by weight of a phenolic anti-oxidizing agent containing sulfur (trade name Irganox 1935 of Ciba Geigy Company) and 0.2 parts by weight of vaseline oil. The mixture was fed (as a blank) into a double-screw extruder LMP-RC27 (L/D=16.6; D=90 mm), provided with an orifice, the outlet section of which had an internal diameter of 10.5 mm and an external diameter of 13.5 mm. Thereafter, 30 parts by weight of Algofrene 114 were injected at approximately one third of the screw length; the residence time, in the portion of the extruder before the point of introduction of Algofrene (that is in the portion where homogenization occurs) being about 5 minutes. The outflowing temperature was approximately 95° C. and the foamed tubular article thus obtained has a density of 40 Kg/m$^3$. Specimens were obtained from this article and submitted to shrinkage test and to evaluation of the surface conditions. Table 1 reports the results. The specimens showed a remarkable shrinkage (after expansion), which lasted also after 7 days. The surface conditions were of lower quality due to the presence of roughness and unevenness. The thus obtained foam materials were therefore not endowed with satisfactory dimensional stability and were of lower quality.

EXAMPLE 2 (COMPARATIVE) AND EXAMPLES 3–5

The comparison composition described in example 1 was loaded with 12.0 parts by weight of a self-extinguishing "Masterbatch" (80% b.w. concentrated masterbatch of a resin based on EVA, containing 20% by weight of Sb$_2$O$_3$ and 60% by weight of decabromodiphenylether). Thereafter, 0.6 parts by weight of 2,3-dimethyl-2,3-diphenylbutane (as activator) was added and finally scalar amounts of a peroxidic initiator, i.e. 0.0 or 0.05, 0.1 and 0.2 parts by weight of 1,1-(ter.butylperoxy)-3,5,5-trimethyl-cyclohexane (corresponding to zero or 0.1, 0.2 and 0.4 parts of product known as Trigonox 29B-50) for 100 parts of basic resin, as indicated in Table 1. Trigonox 29B-50, produced by AKZO, is a 50% by weight solution of said initiator in DOP (di-2-ethyl-hexyl-phthalate). The whole was then granulated within a single-screw extruder (L/D=25; screw diameter=60 mm) at a temperature of about 140° C., within about 2 minutes. The values of the intrinsic viscosity [$\eta$] at 80° C., in tetrahydronaphthalene solution stabilized with Irganox 1076, as well as the values of the Melt Flow Index were determined. Irganox 1076 is the trade name of a phenolic anti-oxidizing agent, produced by Ciba-Geigy Company, based on the octadecyl ester of $\beta$-(3,5-di-terbutyl-4-hydroxyphenyl)-propionic acid. The determination of the intrinsic viscosity was carried out according to ASTM-D-2857-7 re-approved in 1977). No insoluble residue remained in tertrahydronaphthalene heated at 80° C., and this is a proof of the absence of insoluble gels containing ethylenic bonds of the (I) type. Furthermore, the copolymer was substantially completely hydrolyzable. The values of the intrinsic viscosity and MFI are reported in diagrams of FIGS. 1 and 2. The re-structured foam materials of examples 3–5 were characterized by an increase of the intrinsic viscosity (the foams were practically free from gels insoluble in tetrahydronaphthalene at 80° C.), but at the same time they showed a meaningful reduction of the Melt Flow Index. The granulated compositions were then fed to the same double-screw extruder of example 1 and 30 parts by weight were injected (at approximately one third of the screw length) of 1,2-dichlorotetrafluoroethane, while keeping the outflowing temperature of the molten material at about 105° C. The results are reported on Table 1. Soft foam materials were obtained, according to examples 3–5, having low density and endowed with very good dimensional stability, good surface smoothness, fair elastic features and excellent compression strength. They were therefore suitable, for instance, for the packaging or building field (sheaths for thermal insulation of pipes, for electric insulation of cables etc.).

EXAMPLE 6

The comparison blank of Example 1 was loaded with 0.2 parts by weight of 1,1-bis-(ter-butylperoxy)-3,5,5-trimethyl-cyclohexane, in a 50% by weight DOP solution. After mixing at room temperature, the blend was fed into the double-screw extruder of example 1. In the initial portion of the extruder, before the injection of Algofrene, at approximately 140° C., a "selective" re-structuration took place, contemporarily with the homogenization of the blend, within about 5 minutes. Thereafter, 30 parts by weight (at approximately one third of the screw length) of 1,2-dichlorotetrafluoroethane were injected, while keeping the outflowing temperature of the molten resin at about 105° C.; the obtained materials showed a density surprisingly much lower (33 Kg/m$^3$), even in the absence of the pre-treatment described in examples from 3 to 5. Furthermore, the foam materials had a good dimensional stability as well as a satisfactory surface smoothness. All this means also that, being the density equal, it is possible to reduce the consumption of the fluorinated blowing agent.

It must be noted that the particular "selective" re-structuration permits to take advantage of a wider visco-elasticity range, which permits to work at higher extrusion temperatures, thus increasing at the same time the hourly output.

EXAMPLE 7

100 parts of a different basic EVA resin (trade name Elvax 760, produced by Du Pont; vinylacetate content higher than that of the preceding examples: 9.3% by weight; effective density 0.93 g/cm$^3$; Melt Flow Index: 2.0) were loaded with 10 parts by weight of low density homopolymeric polyethylene Baylon 23 L 430, produced by Bayer; effective density 0.923 g/cm$^3$; MFI: 3.8). The resin was mixed with 1.5 parts by weight of Zinc stearate, 0.8 parts of talc, 0.1 parts of phenolic anti-oxidizing agent of the example 1 and 0.2 parts of vaseline oil; finally, 0.3 part by weight of the peroxidic initiator of example 6 were added while working as described in example 6. The (satisfactory) results are recorded on Table 1.

TABLE 1

| Ex. | ADDITIVES (parts by weight) | | Density of the foamed material (Kg/m$^3$) | Shrinkage (% by volume after 7 days) | Surface smoothness conditions (**) |
|---|---|---|---|---|---|
| | Peroxidic initiator | blowing agent | | | |
| 1 (*) | 0 | 30 | 40 | 30.0 | S |
| 2 (*) | 0 | 30 | 45 | 48.5 | S |
| 3 | 0.05 | 30 | 38 | 15.3 | D |
| 4 | 0.1 | 30 | 35 | 10.5 | B |
| 5 | 0.2 | 30 | 30 | 7.5 | B |
| 6 | 0.1 | 30 | 33 | 10.0 | D |
| 7 | 0.15 | 30 | 33 | 10.3 | D |

(*) Comparative
(**) B = good (the surface is smooth, from freon creases)
D = fairly good (the surface presents creases, but it is yet commercially acceptable)
S = poor (surface with very evident creases, which lower the commercial value).

We claim:

1. Soft and low-density non-crosslinked foam materials from copolymers of ethylene with vinyl acetate and/or alkyl esters of acrylic or methacrylic acid, comprising:

the copolymers are at least partially re-structured, in a selective way, substantially showing the particular fused structures (II) and/or (III), namely oxalic and/or succinic bridges at a temperature between 120° and 200° C. in the presence of from 0.05 to 0.5 by weight of a radical initiator;

the amount of co-monomer, with the copolymers, ranges from 5 to 30% by weight;

the copolymers contain an amount of non-hydrolyzable gel substantially null and anyway lower than 5% by weight;

the MFI index of the foams is not greater than 1.1 g/10' (at 2.16 Kg and 190° C.).

2. Foam materials according to claim 1, wherein the comonomer is vinylacetate and the content of vinylacetate in the copolymer is from 5 to 15% by weight and preferably from 7.5 to 10% by weight.

3. Foam materials according to claim 2, wherein said copolymer contain up to 20%, preferably from 5 to 10% by weight, of a different polymeric material and in particular a material selected from low, medium or high density polyethylene, polypropylene and ethylene-propylene copolymers.

4. Foam materials according to claim 2, wherein the selective re-structuration is performed by contacting, at a temperature from 130° to 160° C., the starting synthetic copolymer with an amount from 0.1–0.2%, on the copolymer, of 1,1-bis-(ter.butyl-peroxy)-3,5,5-trimethyl-cyclohexane or with equivalent amounts of another peroxide or other radical initiator, having a decomposition temperature ranging from 120° to 160° C. and preferably from 130° to 160° C.

5. Foam materials according to claim 2, wherein they are practically free from chemical blowing agents or derivatives thereof.

6. Foam materials according to claim 2, wherein they are obtained by the aid of a physical blowing agent consisting of 1,2-dichloro-tetrafluoroethane, optionally admixed with other usual coadjuvant and in particular with carbon dioxide, the amount of said physical agent being preferably from 10 to 40% by weight on the copolymer.

* * * * *